April 20, 1937.  B. S. DOMBROWSKI  2,077,828
RULER
Filed March 19, 1935

Inventor
B. S. Dombrowski
By Clarence A. O'Brien
Attorney

Patented Apr. 20, 1937

2,077,828

UNITED STATES PATENT OFFICE 2,077,828

RULER

Briney S. Dombrowski, Seneca Falls, N. Y., assignor to Westcott Rule Company, Inc., Seneca Falls, N. Y.

Application March 19, 1935, Serial No. 11,863

4 Claims. (Cl. 33—111)

The invention has relation to rulers or scales for use in schools, workshops and the like and the main object of the invention is to facilitate the reading of the graduations or scale on the ruler.

A particular object of the invention is to provide a ruler so equipped as to enable the user thereof to readily distinguish the fractional divisions of the inch spaces on the ruler.

The invention together with its objects and advantages will be best understood from a study of the following description taken in connection with the accompanying drawing wherein.

Figure 1:
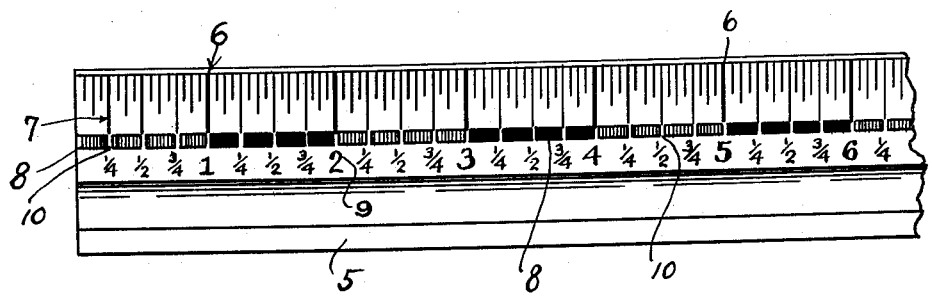
Figure 1 is a face view of the ruler.
Figure 2:
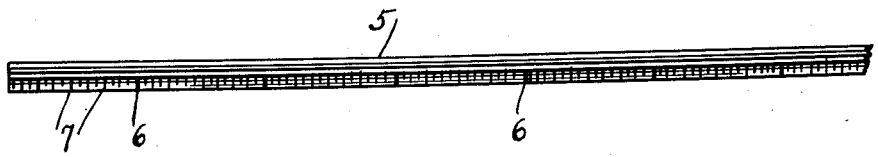
Figure 2 is a plan or edge elevational view thereof.
Figure 3:
Figure 3 is an end elevational view of the ruler.

Referring to the drawing by reference numerals the ruler, as shown, is a one foot rule but may be of any other desired length. In accordance with this invention the ruler indicated generally by the reference numeral 5 is provided with transverse graduating lines 6, which, it will be noted, are relatively heavy, and transverse parallel fractional quarter inch, one-eighth and one-sixteenth graduating lines that are relatively light in comparison to the inch lines 6. The graduating lines 6, 7 extend transversely across the rule for more or less than half the width of the rule.

On the side of the rule shown in Figure 1 each inch space has oblong longitudinal blocks 8, identical as to size, printed or otherwise formed thereon, these blocks being arranged in longitudinal alinement and in relatively spaced relation. Each block is of a length slightly less than one quarter of an inch. The ends of the graduating lines 6, 7 terminate at the spaces between the ends of the blocks 8 and associated with the blocks 8 and the lines 6 are inch indicia 9, while associated with the lines 7 and the blocks 8 are fractional indicia, such as one-fourth, one-half, and three-fourths, and these indicia are located in line with the graduating lines 7 and the spaces between the blocks 8.

The blocks 8 of adjacent or alternating inch spaces are contrastingly colored, red and black being indicated, it being noted that the blocks in one space are all of the same color preferably, and that the color of the blocks and that of the ruler in the spaces 10 between the blocks contrast, the color of the spaces 10 being preferably white.

It will be seen that with my improved ruler the blocks 8 constitute a visual means of readily determining the quarter inch division of each major unit or inch space.

Having thus described my invention, what is claimed as new is:

1. A ruler or scale graduated in inches and fractions thereof, the graduations being indicated by parallel lines disposed transversely of the ruler, each inch space having a plurality of blocks arranged in relatively spaced alinement longitudinally of the ruler, and each being slightly less than one quarter of an inch in length.

2. A ruler or scale graduated in inches and fractions thereof, the graduations being indicated by lines disposed transversely of the ruler, each inch space having a plurality of blocks of the same length arranged longitudinally of the ruler in relatively spaced alinement with their ends terminating each short of its corresponding transverse graduation line.

3. A ruler or scale graduated into major spaces, said major spaces having fractional sub-divisions and blocks of lengths corresponding to the fractional sub-division and substantially coterminous therewith, there being only one of such blocks for each sub-division; and said blocks being relatively spaced and disposed in alignment longitudinally of the ruler.

4. A ruler or scale graduated in inches and fractions thereof, the graduations being indicated by lines disposed transversely of the ruler, each inch space having a plurality of blocks of corresponding lengths arranged longitudinally of the ruler in relatively spaced alinement with their ends terminating each short of its corresponding transverse graduation line, said blocks and the spaces between the ends thereof being in contrasting colors.

BRINEY S. DOMBROWSKI.